July 27, 1926.
F. A. KRUSEMARK
PNEUMATIC TIRE
Filed April 3, 1926
1,594,102
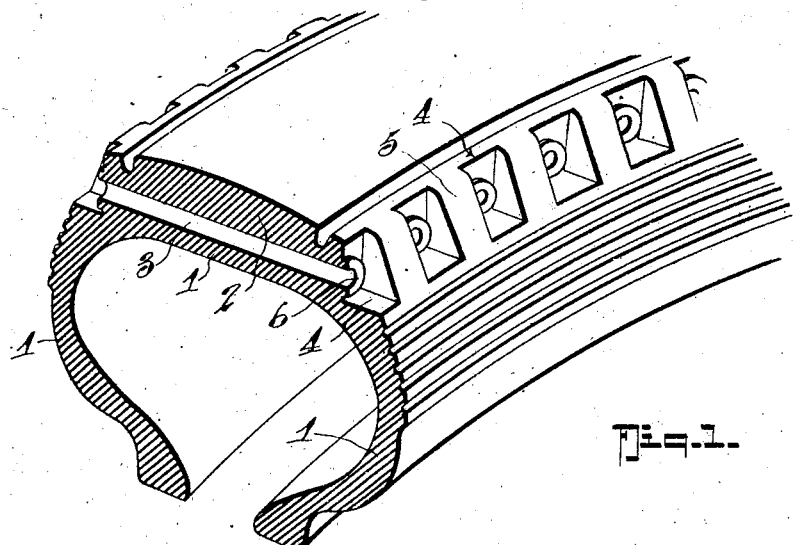
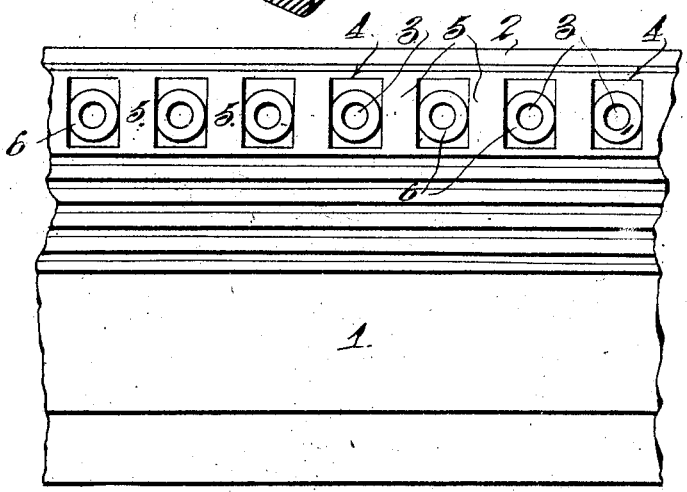
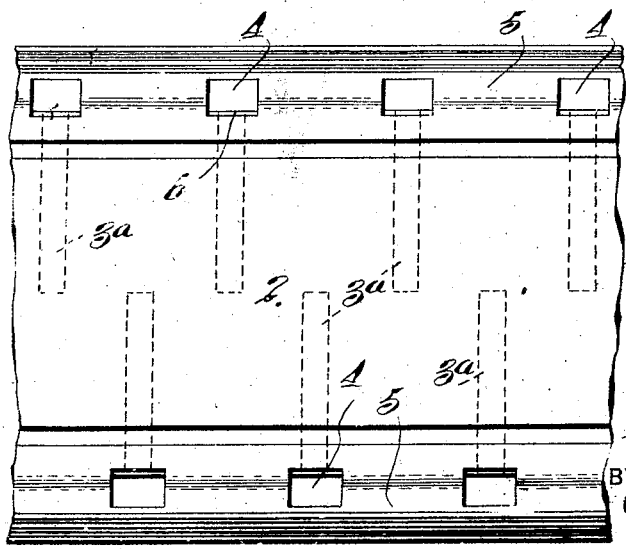
INVENTOR
F. A. Krusemark.
BY
ATTORNEY Patented July 27, 1926.

1,594,102

UNITED STATES PATENT OFFICE.

FREDERICK A. KRUSEMARK, OF AKRON, OHIO, ASSIGNOR TO LAMBERT TIRE & RUBBER CO., OF BARBERTON, OHIO, A CORPORATION OF ARIZONA.

PNEUMATIC TIRE.

REISSUED

Application filed April 3, 1926. Serial No. 99,516.

My invention has for its object to provide certain new and useful improvements in puncture-resisting pneumatic tires of the kind wherein the tread is of greater thickness than standard practice and is provided with transverse openings (recesses, or holes extending partly or entirely through the tire from side to side) and it especially has for its object to provide such a tire with alternate notches or recesses and lugs at the sides of the tread, the recesses aligning with the transverse openings and of a greater area than the diameter of the openings, thereby leaving a series of lugs between adjacent openings whose purpose is to guard the entrances to the openings and prevent or reduce cracking of the rubber at the entrances of the openings as well as to serve as traction lugs when the tire is running over soft ground, such as sand or mud.

More subordinately the invention resides in those novel features of construction, combination and arrangement of parts, all of which will be first fully described, then be specifically pointed out in the appended claims, reference being had to the accompanying drawing, in which:—

Figure 1 is a sectional perspective view of a portion of a tire showing one embodiment of my invention (the openings in this embodiment passing entirely through from side to side).

Figure 2 is a side elevation of the structure shown in Figure 1.

Figure 3 is a plan view of another embodiment of the invention (in this embodiment the openings passing but partly through the tread and being staggered).

In the drawing in which like numerals of reference indicate like parts in all the figures, 1 represents the carcass of the tire which may be built up in accordance with the usual practice, and 2 indicates the tread which in the present instance is built thicker than standard practice and is provided with openings 3 (or 3ª in Figure 3) which serve not only to increase the resiliency of the tread portion of the tire but principally to ventilate the tread rubber and prevent its overheating with consequent disintegration.

4 designates notches or recesses formed in the tread portion of the tire in alignment with the various openings. These recesses or notches are of greater area in elevation than the diameter of the openings whereby lugs 5 are left between adjacent openings, these lugs serving the two-fold purpose of protecting the tire carcass at the mouth of the openings, and as traction lugs when the tire is rolling on a soft road bed as for instance in sand or mud.

It should, of course, be understood that the openings 3 may extend entirely through the tread from side to side (and this is a preferred embodiment) or they may be blind openings extending but partly into the tire tread as indicated at 3ª in Figure 3, and if desired the openings at one side may be staggered with relation to those at the other side as indicated in Figure 3.

In my present invention I do not desire to be understood as limited to any particular depth of openings 3, the essential feature of the present invention being the provision of the notches or recesses 4 and the intermediate lugs 5, the notches or recesses being arranged to align up with the openings, or in other words, the openings beginning at the inner side of the recesses or notches.

If desired the mouths of the openings may further be reinforced by circular beads 6 formed on the inner vertical wall of the recesses or notches.

From the foregoing description, taken in connection with the accompanying drawing, it is thought the construction, operation and advantages of my invention will be clear to those skilled in the art to which it relates.

What I claim is:

1. Pneumatic tires having a carcass with thickened tread, said tread having transverse openings, the entrances to which lie to either side of the mid-plane of the tire, said tread having side walls and being provided with recesses or notches at the junction of the tread face and side walls, said recesses or notches being of greater width than the diameter of said openings, said openings beginning at the inner surfaces of the recesses or notches and extending toward the opposite side of the tread.

2. In pneumatic tires, a carcass having a thickened tread, said tread having openings entering from its sides and being provided with recesses or notches aligning with the outer ends of said openings, thereby leaving lugs at either side of each opening to guard the entrances to said openings.

3. A pneumatic tire having a thickened tread provided with transverse openings from the sides of the tread and having alternately disposed notches and lugs, the openings extending inwardly from the notches, and ring-like beads surrounding the openings within the notches.

FREDERICK A. KRUSEMARK.